United States Patent
Yamamoto et al.

(10) Patent No.: US 8,376,898 B2
(45) Date of Patent: Feb. 19, 2013

(54) AUTOMATIC TRANSMISSION

(75) Inventors: Akihiro Yamamoto, Isehara (JP);
Kazuaki Aota, Sagamihara (JP);
Yukiyoshi Inuta, Sagamihara (JP);
Naoki Kobayashi, Machida (JP);
Kouichi Iizuka, Fuji (JP); Takayuki Okuda, Atsugi (JP); Peter Tenberge, Chemnitz (DE); Joerg Mueller, Chemnitz (DE); Rico Resch, Wilsdruff (DE)

(73) Assignee: Jatco Ltd, Fuji-shi (JP)

(*) Notice: Subject to any disclaimer, the term of this patent is extended or adjusted under 35 U.S.C. 154(b) by 190 days.

(21) Appl. No.: 12/847,421

(22) Filed: Jul. 30, 2010

(65) Prior Publication Data
US 2011/0028262 A1 Feb. 3, 2011

(30) Foreign Application Priority Data
Jul. 31, 2009 (JP) ................. 2009-178804

(51) Int. Cl.
*F16H 3/44* (2006.01)
(52) U.S. Cl. ................. 475/287; 475/319; 475/325
(58) Field of Classification Search ............ 475/286, 475/287
See application file for complete search history.

(56) References Cited

U.S. PATENT DOCUMENTS

| | | | |
|---|---|---|---|
| 5,133,697 A * | 7/1992 | Hattori | 475/276 |
| 6,746,358 B2 * | 6/2004 | Bucknor et al. | 475/276 |
| 6,932,735 B2 | 8/2005 | Kao et al. | |
| 7,086,986 B2 * | 8/2006 | Raghavan et al. | 475/279 |
| 7,094,173 B2 | 8/2006 | Raghavan et al. | |
| 7,611,438 B2 | 11/2009 | Diosi et al. | |
| 7,686,732 B2 * | 3/2010 | Raghavan et al. | 475/278 |
| 7,731,622 B2 | 6/2010 | Wittkopp et al. | |
| 8,047,953 B2 | 11/2011 | Wittkopp et al. | |
| 2003/0232687 A1 | 12/2003 | Buchnor et al. | |
| 2004/0229725 A1 | 11/2004 | Hiraiwa | |

(Continued)

FOREIGN PATENT DOCUMENTS

| | | |
|---|---|---|
| DE | 10 2004 041 446 A1 | 3/2006 |
| EP | 1 398 528 A2 | 3/2004 |

(Continued)

OTHER PUBLICATIONS

U.S. Appl. No. 12/947,378, filed Nov. 16, 2010, Aota et al.

(Continued)

*Primary Examiner* — David D Le
*Assistant Examiner* — Colby M Hansen
(74) *Attorney, Agent, or Firm* — Foley & Lardner LLP (57) ABSTRACT

An automatic transmission comprising: a first planetary gearset of a double pinion; a second planetary gearset of a single pinion; a third planetary gearset of the single pinion, first sun gear and second sun gear being at all times linked together to constitute a first rotary member and second ring gear and third sun gear being at all times linked together to constitute a second rotary member; an input shaft; an output shaft; a first frictional element; a second frictional element; a third frictional element; a fourth frictional element; a fifth frictional element; a sixth frictional element, the six frictional elements being appropriately released or engaged to make a gear shift to a gear shift stage of at least eight forward speeds and, from among the six frictional elements, a combination of simultaneous engagements of three frictional elements achieving at least eight forward speed and one reverse speed.

8 Claims, 8 Drawing Sheets

U.S. PATENT DOCUMENTS

| | | |
|---|---|---|
| 2005/0090362 A1 | 4/2005 | Abe et al. |
| 2006/0148610 A1 | 7/2006 | Usoro et al. |
| 2007/0213169 A1 | 9/2007 | Gumpoltsberger |
| 2007/0259753 A1 | 11/2007 | Diosi et al. |
| 2008/0242479 A1 | 10/2008 | Hart et al. |
| 2008/0242484 A1 | 10/2008 | Hart et al. |
| 2008/0293535 A1 | 11/2008 | Phillips et al. |
| 2008/0300088 A1 | 12/2008 | Hart et al. |
| 2009/0023535 A1 | 1/2009 | Wittkopp et al. |
| 2009/0023538 A1 | 1/2009 | Carey et al. |
| 2009/0036254 A1 | 2/2009 | Wittkopp et al. |
| 2009/0048061 A1 | 2/2009 | Hart et al. |
| 2009/0215579 A1 | 8/2009 | Phillips |
| 2010/0184553 A1 | 7/2010 | Wittkopp et al. |

FOREIGN PATENT DOCUMENTS

| | | |
|---|---|---|
| EP | 1 398 533 A2 | 3/2004 |
| JP | 2001-182785 A | 7/2001 |

OTHER PUBLICATIONS

K. Aota, U.S. PTO Office Action, U.S. Appl. No. 12/731,892, dated Apr. 20, 2012, 21 pages.

U.S. Appl. No. 12/847,380, filed Jul. 30, 2010, Yamamoto et al.

U.S. Appl. No. 12/731,899, filed Mar. 25, 2010, Aota et al.

U.S. Appl. No. 12/731,892, filed Mar. 25, 2010, Aota et al.

K. Aota, U.S. PTO Notice of Allowance and Allowability, U.S. Appl. No. 12/731,899, dated Sep. 22, 2011, 17 pages.

A. Yamamoto, U.S. PTO Office Action, U.S. Appl. No. 12/847,380, dated Nov. 7, 2011, 12 pages.

K. Aota, U.S. PTO Office Action, U.S. Appl. No. 12/947,378, dated Aug. 13, 2012, 17 pages.

K. Aota, U.S. PTO Notice of Allowance, U.S. Appl. No. 12/731,892, dated Oct. 1, 2012, 8 pages.

* cited by examiner

| | C1 | C2 | C3 | C4 | B1 | B2 | GEAR RATIO | STEP RATIO |
|---|---|---|---|---|---|---|---|---|
| | | | | | | | ρ1 = −0.433 | |
| | | | | | | | ρ2 = 0.276 | RC = 10.774 |
| | | | | | | | ρ3 = 0.508 | Rev/1st = 1.002 |
| 1st | | O | | | O | O | 4.647 | 1.566 |
| 2nd | O | O | | | | O | 2.967 | 1.582 |
| 3rd | O | | O | | | O | 1.875 | 1.421 |
| 4th | O | | | O | | O | 1.320 | 1.320 |
| 5th | O | O | | O | | | 1.000 | 1.318 |
| 6th | O | | | O | O | | 0.759 | 1.326 |
| 7th | | O | | O | O | | 0.572 | 1.323 |
| 8th | | | O | O | O | | 0.433 | |
| Rev | O | | | | O | O | −4.657 | |

|  | C1 | C2 | C3 | C4 | B1 | B2 | GEAR RATIO |
|---|---|---|---|---|---|---|---|
| 1st | O |  |  |  |  | O | 4.597 |
| 2nd | O |  |  |  | O |  | 2.724 |
| 3rd | O | O |  |  |  |  | 1.864 |
| 4th | O |  |  | O |  |  | 1.464 |
| 5th | O |  | O |  |  |  | 1.231 |
| 6th |  |  | O | O |  |  | 1.000 |
| 7th |  | O | O |  |  |  | 0.824 |
| 8th |  |  | O |  | O |  | 0.685 |
| Rev1 |  | O |  |  |  | O | 4.056 |
| Rev2 |  |  |  | O |  | O | 2.176 |
|  |  |  |  |  |  | R/C | 6.711 |
|  |  |  |  |  |  | Rev1/1st | 0.882 |
|  |  |  |  |  |  | Rev2/1st | 0.473 |

FIG.15

|  | C1 | C2 | C3 | C4 | B1 | B2 | GEAR RATIO | STEP RATIO |
|---|---|---|---|---|---|---|---|---|
| 1st |  | ○ |  |  | ○ | ○ | 4.647 | 1.566 |
| 2nd | ○ | ○ |  |  |  | ○ | 2.967 | 1.582 |
| 3rd | ○ |  | ○ |  |  | ○ | 1.875 | 1.421 |
| 4th | ○ |  |  | ○ |  | ○ | 1.320 | 1.320 |
| 5th | ○ |  | ○ | ○ |  |  | 1.000 | 1.318 |
| 6th | ○ |  |  | ○ | ○ |  | 0.759 | 1.326 |
| 7th |  | ○ |  | ○ | ○ |  | 0.572 | 1.323 |
| 8th |  |  | ○ | ○ | ○ |  | 0.433 | |
| Rev | ○ |  |  |  | ○ | ○ | −4.657 | |

$\rho 1 = -0.433$
$\rho 2 = 0.276$    RC = 10.774
$\rho 3 = 0.508$    Rev/1st = 1.002

FIG.16

AUTOMATIC TRANSMISSION

BACKGROUND OF THE INVENTION (1) Field of the Invention

The present invention relates to an automatic transmission which is suitable as a vehicular transmission mechanism for which multi-stage demand of gear shift stages and widening demand of a gear ratio width are present.

(2) Description of Related Art

A Japanese Patent Application First Publication No, 2001-182785 published on Jul. 6, 2001 exemplifies a previously proposed automatic transmission achieving respective gear shift stages of eight forward speeds (speed ratios) by means of three planetary gearsets and six frictional elements and which is provided with a double pinion planetary gearset, a Ravineaux planetary gear unit (one double pinion planetary gearset and one single pinion planetary gearset), four clutches, and two brakes.

SUMMARY OF THE INVENTION

However, in the previously proposed automatic transmission, when each of gear shift stages is achieved, two frictional elements are clutched. Hence, in each gear shift stage, the frictional elements which run idle are four for the respective gear shift stages. Hence, a friction loss at each of the frictional elements which runs idle is large and this introduces worsening of a transmission efficiency of a drive energy.

Especially, in a case of a multi-plate clutch or a multi-plate brake which is frequently used as a frictional element, oil sprayed for cooling and lubrication purposes when the frictional element is released and, thus, is in an idle run state is intervened between relatively revolving plates. Thus, the generation of a frictional loss due to a drag resistance (a shear resistance of oil) cannot be achieved. In this addition, this frictional loss becomes larger as the number of such plates as described above are greater and relative revolutional speed between plates due to the large number of plates becomes higher.

It is, therefore, an object of the present invention to provide an automatic transmission which is capable of improving the transmission efficiency of the drive energy by suppressing the frictional loss to be reduced while achieving the eight forward speeds with the three planetary gearset and six frictional elements.

According to one aspect of the present invention, there is provided an automatic transmission comprising: a first planetary gearset including a first sun gear, a first ring gear, and a first carrier supporting a first double pinion meshed with the first sun gear and the first ring gear; a second planetary gearset including a second sun gear, a second carrier supporting a second pinion meshed with the second sun gear, and a second ring gear meshed with the second pinion; a third planetary gearset including a third sun gear, a third carrier supporting a third pinion meshed with the third sun gear, and a third ring gear meshed with the third pinion, the first sun gear and the second sun gear being at all times linked together to constitute a first rotary member and the second ring gear and the third sun gear being at all times linked together to constitute a second rotary member; an input shaft linked at all times with the first ring gear; an output shaft linked at all times with the third carrier; a first frictional element which is selectively linked between the first carrier and the second carrier; a second frictional element which is selectively linked between the first ring gear and the second carrier; a third frictional element which is selectively linked between the first rotary member and the third carrier; a fourth frictional element which is selectively linked between the first rotary member and the third ring gear; a fifth frictional element which is capable of stopping in an engaged state a revolution of the first carrier; and a sixth frictional element which is capable of stopping in the engaged state the revolution of the third ring gear, the six frictional elements being appropriately released or engaged to make a gear shift to a gear shift stage of at least eight forward speeds in order for a torque from the input shaft thereof to be enabled to be outputted to the output shaft and, from among the six frictional elements, a combination of simultaneous engagements of three frictional elements achieving at least eight forward speeds and one reverse speed.

DETAILED DESCRIPTION OF THE INVENTION

Preferred embodiments achieving an automatic transmission according to the present invention will be described below on a basis of first and second preferred embodiments shown in the accompanied drawings.

First Embodiment

First, a structure of the automatic transmission will be described below.

Figure 1:
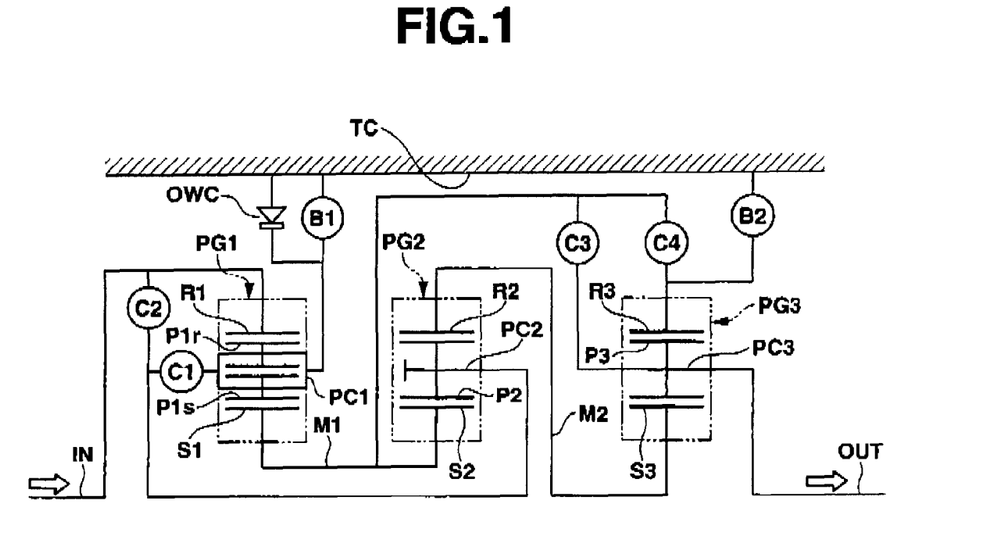
FIG. 1 is a skeleton view representing an automatic transmission in a first preferred embodiment according to the present invention.

FIG. 1 shows a skeleton view representing the automatic transmission in the first preferred embodiment according to the present invention. Hereinafter, structures of planetary gearsets and frictional elements will be described below on a basis of FIG. 1.

The automatic transmission in the first embodiment includes, as shown in FIG. 1, a first planetary gearset PG1, a second planetary gearset PG2, a third planetary gearset PG3, an input shaft IN, an output shaft OUT, a first rotary member M1, a second rotary member M2, a first clutch C1 (a first frictional element), a second clutch C2 (a second frictional element), a third clutch (a third frictional element), a fourth clutch C4 (a fourth frictional element), a first brake B1 (a fifth frictional element), a second brake B2 (a sixth frictional element), a transmission casing TC, and a one-way dutch OWC.

First planetary gearset PG1 is a double pinion planetary gearset having a first double pinion P1s, P1r and including a first sun gear S1, pinion P1s meshed with first sun gear S1, a first carrier PC1 supporting a pinion P1r meshed with second pinion P2, and a first ring gear R1 meshed with pinion P1r.

Second planetary gearset PG2 includes a single pinion planetary gearset and includes a second sun gear S2, a second carrier PC2 supporting a second pinion P2 meshed with second sun gear S2, and a second ring gear R2 meshed with second pinion P2.

Third planetary gearset PG3 is the single pinion planetary gearset and includes a third sun gear S3, a third carrier PC3 supporting a third pinion P3 meshed with third sun gear S3, and a third ring gear R3 meshed with third pinion P3.

Input shaft IN is an axle through which a revolution drive torque from a drive source (an engine and so forth) is inputted via a torque converter and so forth and is always linked with first ring gear PC3.

Output shaft OUT is an axle through which the revolution drive torque after the gear shift to the drive wheels via the propeller shaft and the final gear and is at all times linked with first ring gear R1.

First revolution (rotary) member M1 is a rotary member that at all times makes first sun gear S1 link with second sun gear S2 without intervention of the frictional element.

Second revolution (rotary) member M2 is a rotary member that at all times makes second ring gear R2 link with third sun gear S3 without any intervention of the frictional elements.

First clutch C1 is a first frictional element which selectively links between first carrier PC1 and second carrier PC2.

Second clutch C2 is a second frictional element which selectively links between first ring gear R1 and second carrier PC2.

Third clutch C3 is a third frictional element which selectively links between first rotary member M1 and third carrier PC3.

Fourth clutch C4 is a fourth frictional element which selectively links between first rotary member M1 and third ring gear R3.

First brake B1 is a fifth frictional element which is capable of stopping in an engaged state a revolution of first carrier PC1 with respect to transmission casing TC. It should be noted that one-way clutch OWC which performs a self-release during a coasting and which performs a self-lock during a drive at a position parallel to first brake B1.

Second brake B2 is a sixth frictional element which is capable of stopping in the engaged state a revolution of third ring gear R3 with respect to transmission casing TC.

A longitudinal arrangement of first planetary gearset PG1, second planetary gearset PG2, and third planetary gearset PG3 is made in a sequence from input shaft IN to which the drive source is connected to output shaft OUT, as shown in FIG. 1.

Figure 2:
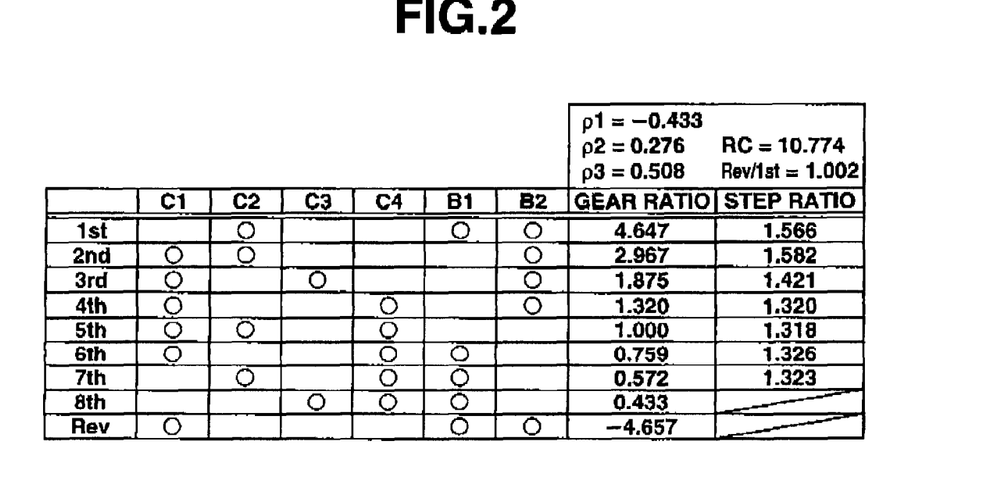
FIG. 2 is a table representing engagement operations achieving eight forward speeds and one reverse speed by a combination of simultaneous engagements of three frictional elements from among six frictional elements.

FIG. 2 shows a table representing the engagement operations achieving eight forward speeds and one reverse speed by a combination of simultaneous engagements of three frictional elements from among six frictional elements in the automatic transmission in the first preferred embodiment. Hereinafter, the gear shift structure achieving the respective gear shift stages of the automatic transmission in the first preferred embodiment according to the present invention will be described below with reference to FIG. 2.

Automatic transmission in the first embodiment achieves the respective gear shift stages of the eight forward speeds (speed ratios) and one reverse speed as will be described later by the combination of simultaneous engagements of three of six frictional elements C1, C2, C3, C4, B1, and B2.

The gear shift stage of a first speed (1-st) is achieved by the simultaneous engagements of second clutch C2, first brake 51 (or a one-way clutch OWC), and a second brake 52, as shown in FIG. 2.

The gear shift stage of a second speed (2-nd speed) is achieved by the simultaneous engagements of first dutch C1, second clutch C2, and second brake S2, as shown in FIG. 2.

The gear shift stage of a third speed (3-rd speed) is achieved by the simultaneous engagements of first clutch C1, fourth clutch C4, and second brake 52, as shown in FIG. 2.

The gear shift stage of a fourth speed (4-th speed) is achieved by the simultaneous engagements of first clutch C1, fourth clutch C4, and second brake B2, as shown in FIG. 2.

The gear shift stage of a fifth (5-th speed) is achieved by simultaneous engagements of first clutch C1, third clutch C3, and fourth clutch C4, as shown in FIG. 2.

The gear shift stage of a sixth speed (6-th speed) is achieved by the simultaneous engagements of first clutch C1, fourth clutch C4, and first brake B1, as shown in FIG. 2.

The gear shift stage of a seventh speed (7-th speed) is achieved by the simultaneous engagements of second clutch C2, fourth clutch C4, and first brake B1, as shown in FIG. 2.

The gear shift stage of an eighth speed (8-th speed) is achieved by the simultaneous engagements of third clutch C3, fourth clutch C4, and first brake B1.

The gear shift stage of a reverse speed (Rev) is achieved by the simultaneous engagements of first clutch C1, first brake B1, and second brake B2, as shown in FIG. 2.

Next, an action of the automatic transmission in the first embodiment will be described below. The action in automatic transmission of the first embodiment will be described by dividing explanation items of the action into "a gear shift action in each gear shift stage" and "advantages as compared with a comparative example to the present invention".

[Gear Shift Stage Action at Each of the Shift Stages] (Gear Shift Stage at the First Speed)

Figure 4:
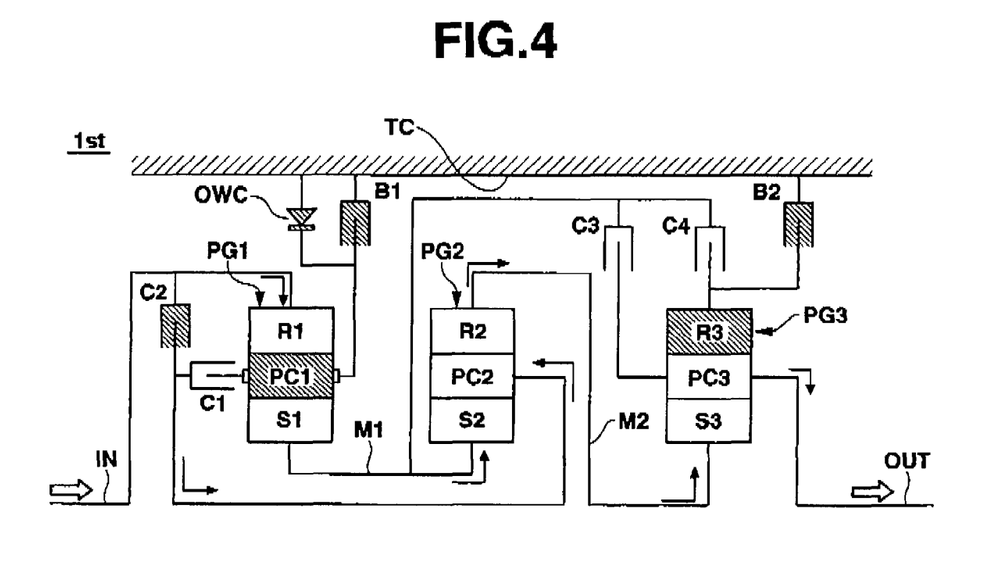
FIG. 4 is an explanatory view of a gear shift section at a first speed gear shift stage (1-st speed) in the automatic transmission of the first preferred embodiment.

At the gear shift stage at the first speed (1-st) (ratio), second clutch C2, one-way clutch OWC, and second brake B2 are simultaneously engaged during a driving and second clutch C2, first brake B1, and second brake B2 are simultaneously engaged during a coasting. The engagement of second clutch C2 causes a direct coupling of second carrier PC2 to an input shaft IN.

The engagement of first brake B1 or a self-lock of one-way clutch OWC causes first carrier PC1 to be fixed to transmission casing TC. The engagement of second brake B2 causes third ring gear R3 to be fixed to transmission casing TC.

Hence, when an input revolution speed is inputted to first ring gear R1 via input shaft IN, in first planetary gearset PG1 of a carrier fixture, the revolution speed in which the speed is increased in a positive direction with respect to the input revolution speed is outputted from first sun gear S1. Then, in third planetary gearset PG3 of a ring gear fixture, the revolution speed of second ring gear R2 is inputted to third sun gear S3 passing through a second rotary member M2. Hence, the revolution speed to which the revolution speed of second ring gear R2 is decelerated is outputted from third carrier PC3. The output revolution speed of this third carrier PC3 (=deceleration revolution which is lower than input revolution speed) is directly transmitted from third carrier PC3 to output shaft OUT to achieve the first speed gear shift stage.

(Second Speed Gear Shift Stage)

Figure 5:
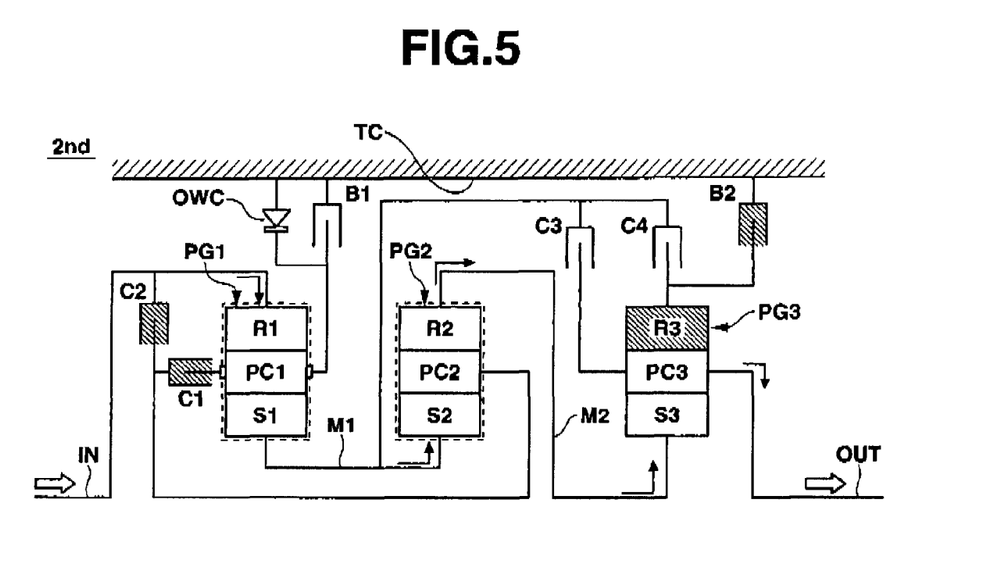
FIG. 5 is an explanatory view of the gear shift section at a second gear shift stage (2-nd speed) in the automatic transmission of the first preferred embodiment.

In the second speed gear shift stage, first clutch C1, second clutch C2, and second brake B2 are simultaneously engaged together, as shown in hatchings of FIG. 5.

The simultaneous engagement of first clutch C1 and second clutch C2 causes three rotary members S1, PC1, R1 of first planetary gearset PG1 to be rotated together in a unit and three rotary members S2, PC2, R2 of second planetary gearset PG2 to be rotated together in a unit. Then, the engagement of second brake B2 causes third ring gear R3 to be fixed to transmission casing TC.

Hence, the input revolution speed is inputted to first ring gear R1 via input shaft IN. At this time, the input revolution speed from input shaft IN is outputted from second ring gear R2 passing through first planetary gearset PG1 in an integral revolution state→first rotary member M1→second planetary gearset PG2 in the integral revolution state. Then, in third planetary gearset PG3 of the ring fixture state, the input revolution speed of second ring gear R2 is inputted to third ring gear S3 passing through second rotary member M2. Hence, the revolution speed to which the input revolution speed is decelerated is outputted from third carrier PC3. The to output revolution speed of third carrier PC3 (the deceleration revolution which is higher than the first speed although lower than the input revolution speed) is directly transmitted to output shaft OUT from third carrier PC3 to achieve the second speed gear shift stage.

(Third Gear Shift Stage)

Figure 6:
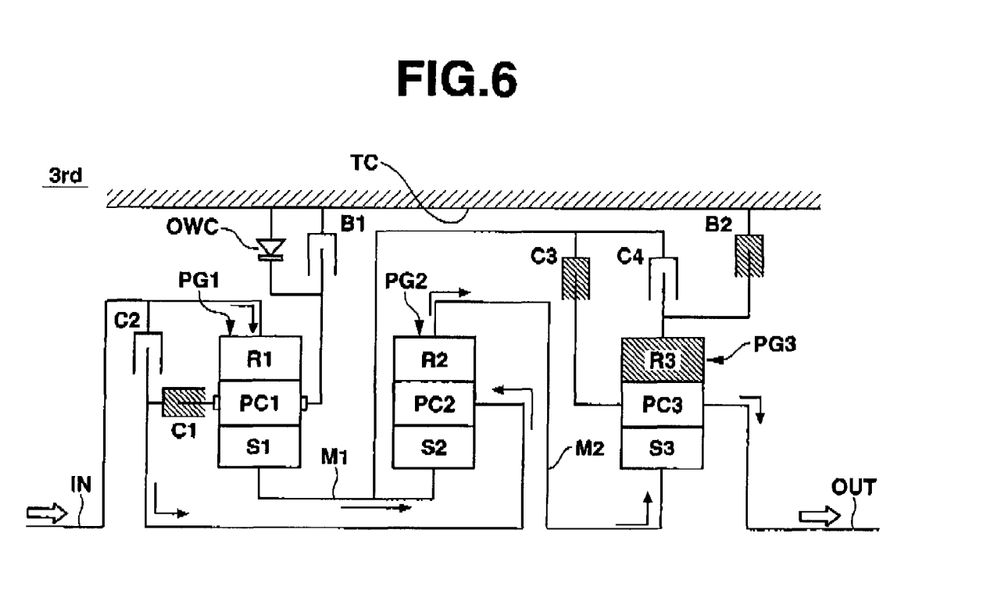
FIG. 6 is an explanatory view of the gear shift section at a third gear shift stage (3-rd speed) in the automatic transmission of the first preferred embodiment.
Figure 7:
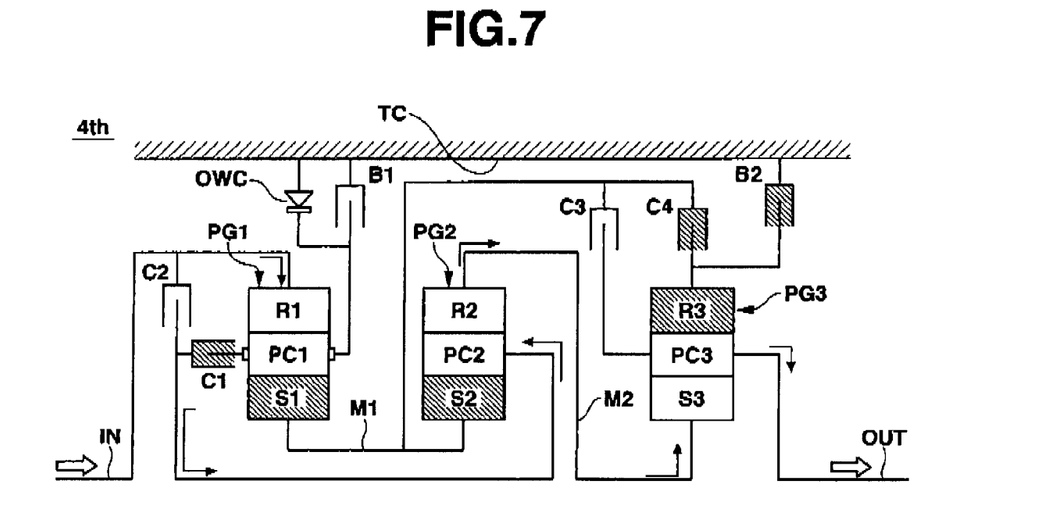
FIG. 7 is an explanatory view of the gear shift section at a fourth gear shift stage (4-th speed) in the automatic transmission of the first preferred embodiment.

In the third gear shift stage, first clutch C1, third clutch C3, and second brake B2 are simultaneously engaged as shown in the hatchings of FIG. 6.

The engagement of first clutch C1 causes first carrier PC1 and second carrier PC2 to be directly coupled together. The engagement of third clutch C3 and first rotary member M1 permits the direct coupling among first sun gear S1, second sun gear S2, and third carrier PC3. The engagement of second brake B2 causes third ring gear R3 to be fixed to transmission casing TC.

Hence, the input revolution speed is inputted to first ring gear R1 passing through input shaft IN. At this time, restriction conditions such that (revolution speed of first carrier PC1) (revolution speed of second carrier PC2), (revolution speed of first sun gear S1)=(revolution speed of first sun gear S1)=(revolution speed of second sun gear S2)=(revolution speed of third carrier PC3)<input revolution speed are established. According to these restriction conditions, the revolution speeds of second sun gear S2 and second carrier PC2 are determined in second planetary gearset PG2 of the two inputs and one output. Hence, the revolution speed at which the revolution speed is increased in the positive direction with respect to the input revolution speed is inputted to third sun gear S3. Hence, the revolution speed at which the revolution speed of second ring gear R2 is decelerated is outputted from third carrier PC3. The output revolution speed of third carrier PC3 (the deceleration revolution higher than the third speed but lower than the input revolution speed) is directly transmitted from third carrier PC3 to output shaft OUT to achieve the gear shift stage of the fourth speed.

(Fifth Speed Gear Shift)

Figure 8:
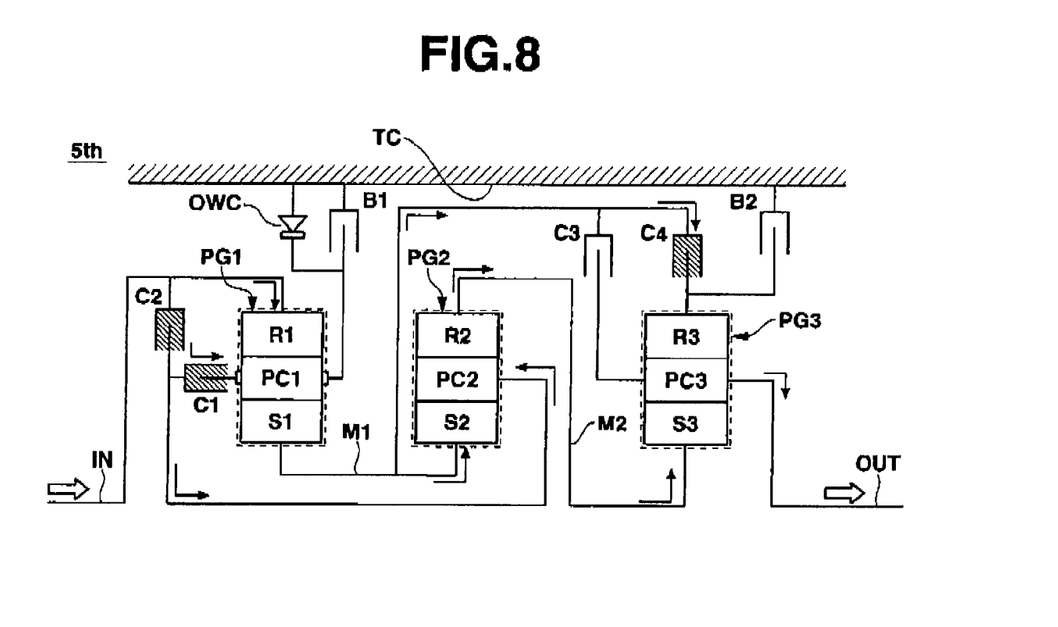
FIG. 8 is an explanatory view of the gear shift section at a fifth gear shift stage (5-th speed) in the automatic transmission of the first preferred embodiment.

In the gear shift stage in the fifth speed, first clutch C1, second clutch C2, and fourth clutch C4 are simultaneously engaged as denoted by the hatchings in FIG. 8.

The simultaneous engagements of first clutch C1, second clutch C2, and fourth clutch C4, first rotary member M1, and second rotary member M2 cause three rotary elements S1, PC1, and R1 in first planetary gearset PG1 to be rotated together in a unit, three rotary elements S2, PC2, R2 of second planetary gearset PG2 to be rotated together in a unit, and three rotary elements S3, PC3, and R3 of third planetary gearset PG3 to be rotated together in a unit.

Hence, when the input revolution speed is inputted to first ring gear R1 passing through input shaft IN, the input revolution speed causes first planetary gearset PG1, second planetary gearset PG2, and third planetary gearset PG3 to be rotated together in a unit. Hence, the revolution speed of output shaft OUT becomes the same revolution speed of the input revolution speed from input shaft IN to achieve the transmission in a 1-st gear shift ratio and fifth clutching (the direct coupled gear shift).

(Gear Shift Stage at the Sixth Speed)

Figure 9:
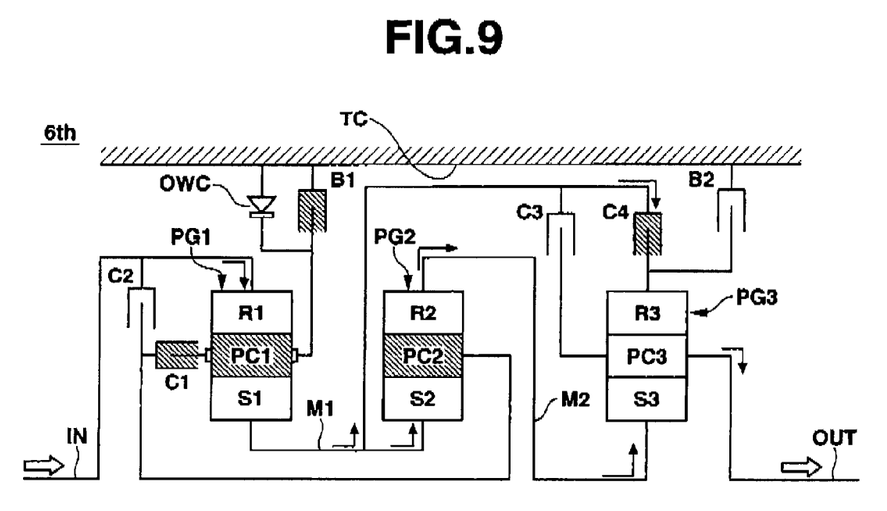
FIG. 9 is an explanatory view of the gear shift section at a sixth gear shift stage (6-th speed) in the automatic transmission of the first preferred embodiment.

In the sixth gear shift stage (the sixth speed), first clutch C1, fourth clutch C4, and first brake B1 are simultaneously engaged, as shown by the hatchings of FIG. 9.

Hence, the input revolution speed is inputted to first ring gear R1 passing through input shaft IN. At this time, the revolution speed at which the increase in the revolution speed in the positive direction with respect to the input revolution speed is outputted from first sun gear S1. Then, in second planetary gearset PG2 of the carrier fixture, the revolution speed of first sun gear S1 is inputted to second sun gear S2 passing through first rotary member M1. Hence, in third planetary gearset PG3 of the two inputs and one output, the revolution speed of first rotary member M1 is inputted to third ring gear R3 passing through fourth clutch C4. Hence, the revolution speed to which the revolution speed of second ring gear R2 is increased is outputted from third carrier PC3. The output revolution speed (the revolution speed higher than the input revolution speed) is directly transmitted to output shaft OUT to achieve the gear shift stage of the sixth speed.

(Gear Shift Stage of Seventh Speed)

Figure 10:
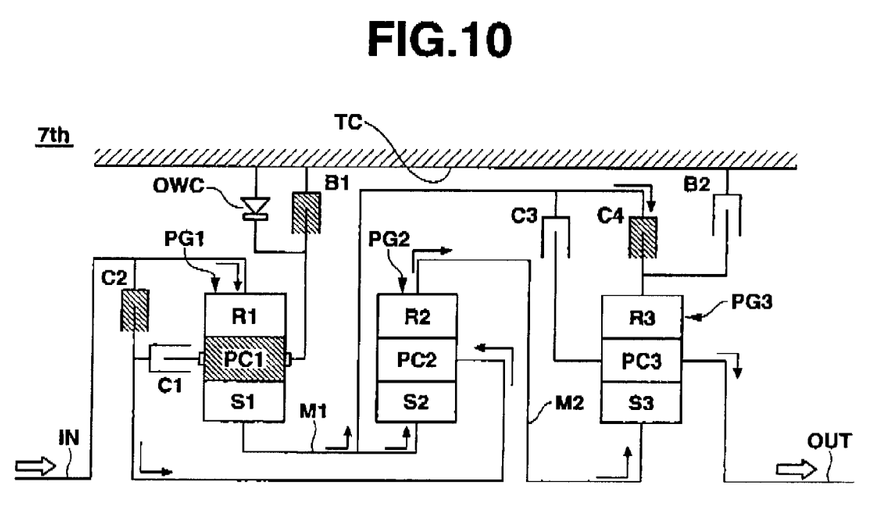
FIG. 10 is an explanatory view of the gear shift section at a seventh gear shift stage (7-th speed) in the automatic transmission of the first preferred embodiment.

In the gear shift stage of the seventh speed, second clutch C2, fourth clutch C4, and first brake B1 are simultaneously engaged as shown in the hatchings of FIG. 10.

The engagement of second clutch C2 causes the input revolution speed to be inputted to second carrier PC2. The engagement of fourth clutch C4 causes the direct coupling among first sun gear S1, second sun gear 52, and third ring gear R3. The engagement of first brake B1 causes first carrier PC1 to be fixed to transmission casing TC.

Hence, when the input revolution speed is inputted to first ring gear R1 passing through input shaft IN, the revolution speed to which the input revolution speed is increased in the positive direction is outputted from first sun gear S1. Then, in second planetary gearset PG2 of the two inputs and one output, the revolution speed of first sun gear S1 is inputted to second sun gear 52 passing through first rotary member M1 and is inputted to second carrier PC2 via second clutch C2. Hence, the revolution speed to which the input revolution speed is decelerated in the positive direction is outputted from second ring gear R2. Then, in third planetary gearset PG3 of the two inputs and one output, the revolution speed of second ring gear R2 is inputted to third sun gear S3 via second rotary member M2 and the revolution speed of first rotary member M1 is inputted to third ring gear R3 via second rotary member M2. Thus, the revolution speed to which revolution speed of second ring gear R2 is increased is outputted to third carrier PC3. The output revolution speed of this third carrier PC3 (increased speed revolution higher than the input revolution speed and the sixth speed) is directly transmitted to output shaft OUT from third carrier PC3 to achieve the gear shift stage of 7-th speed.

(Gear Shift Stage of Eighth Speed)

Figure 11:
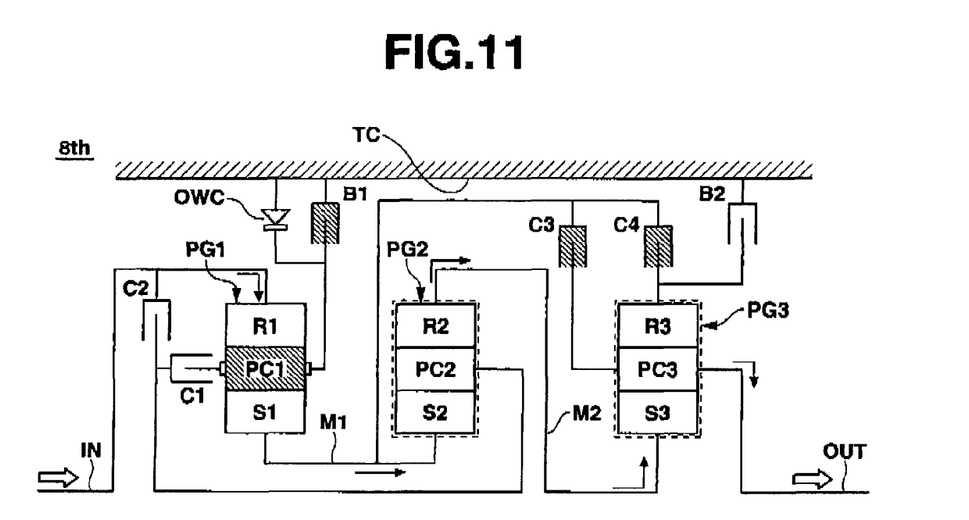
FIG. 11 is an explanatory view of the gear shift section at an eighth gear shift stage (8-th speed) in the automatic transmission of the first embodiment.

In the gear shift stage of the eighth speed, third clutch C3, fourth clutch C4, and first brake B1 are simultaneously engaged as shown in the hatchings of FIG. 11.

The simultaneous engagements of third clutch C3 and fourth clutch C4, first rotary member M1, and second rotary member M2 cause three rotary elements 52, PC2, R2 in second planetary gearset PG2 to be rotated together in a unit and cause three rotary elements 53, PC3, R3 in third planetary gearset PG3 to be rotated together in a unit. The engagements of first brake B1 cause first carrier PC1 to be fixed to transmission casing TC.

Hence, when the input revolution speed is inputted to first ring gear R1 via input shaft IN, the revolution speed to which the input revolution speed is increased in the positive direction with respect to the input revolution speed is outputted from first sun gear S1. The output revolution from first sun gear S1 is increased in the positive direction and is outputted via first rotary member M1→second planetary gearset PG2 (integrated rotation)→second rotary member M2→third planetary gearset PG3 (integral revolution). This output revolution speed (increased speed revolution higher than the input revolution speed and higher than seventh speed) is directly transmitted to output shaft OUT via third carrier PC3 to achieve the gear shift stage of the eighth speed.

(Gear Shift Stage at the Reverse Speed)

Figure 12:
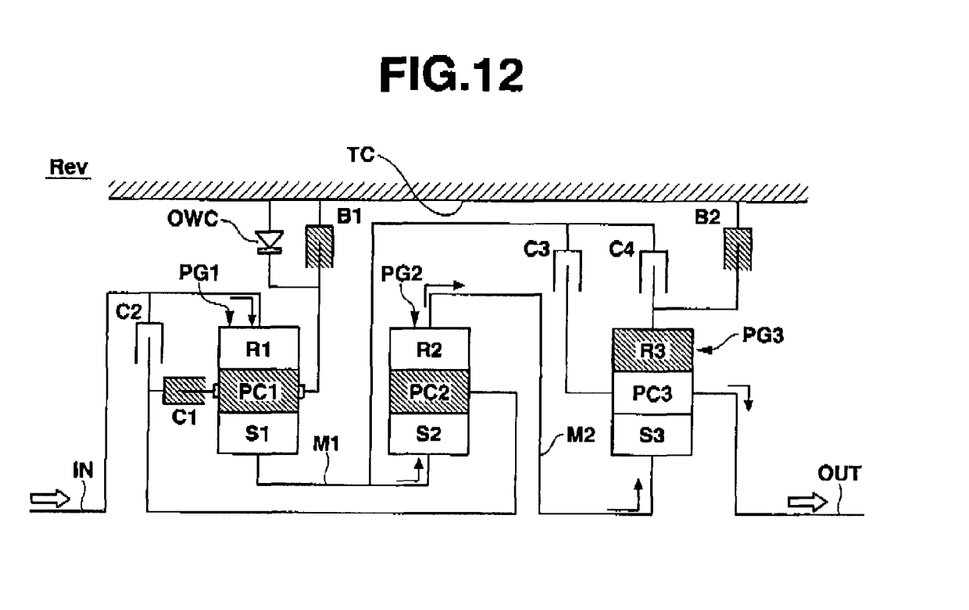
FIG. 12 is an explanatory view of the gear shift section at a reverse (Rev) gear shift stage in the first embodiment of the automatic transmission.

In the gear shift stage of the reverse speed (Rev), first clutch C1, first brake B1, and second brake B2 are simultaneously engaged as shown in the hatchings in FIG. 12.

The simultaneous engagement of first clutch C1 and first brake B1 causes first carrier PC1 and second carrier PC2 to be fixed to transmission casing TC. The engagement of second brake B2 causes third ring gear R3 to be fixed to transmission casing TC.

Hence, when input revolution speed is inputted to first ring gear R1 via input shaft IN, the revolution speed to which the speed is increased in the positive direction is outputted from first sun gear S1. Then, in second planetary gearset PG3 of the ring gear fixture, the revolution speed of second ring gear R2 is inputted to third sun gear via second rotary member M2. Hence, in third planetary gearset PG3 of the ring gear fixture, the revolution speed of second ring gear R2 is inputted to third sun gear S3 via second rotary member M2. Then, the revolution speed of second ring gear R2 is inputted to third sun gear S3 via second rotary member M2. Thus, the revolution speed to which the revolution speed of second ring gear R2 is decelerated is outputted from third carrier PC3. This output revolution speed of third carrier PC3 (the reverse revolution to the input revolution) is directly transmitted to output shaft OUT to achieve the reverse speed gear shift stage.

(Advantages as Compared with the Comparative Example)

Figure 13:
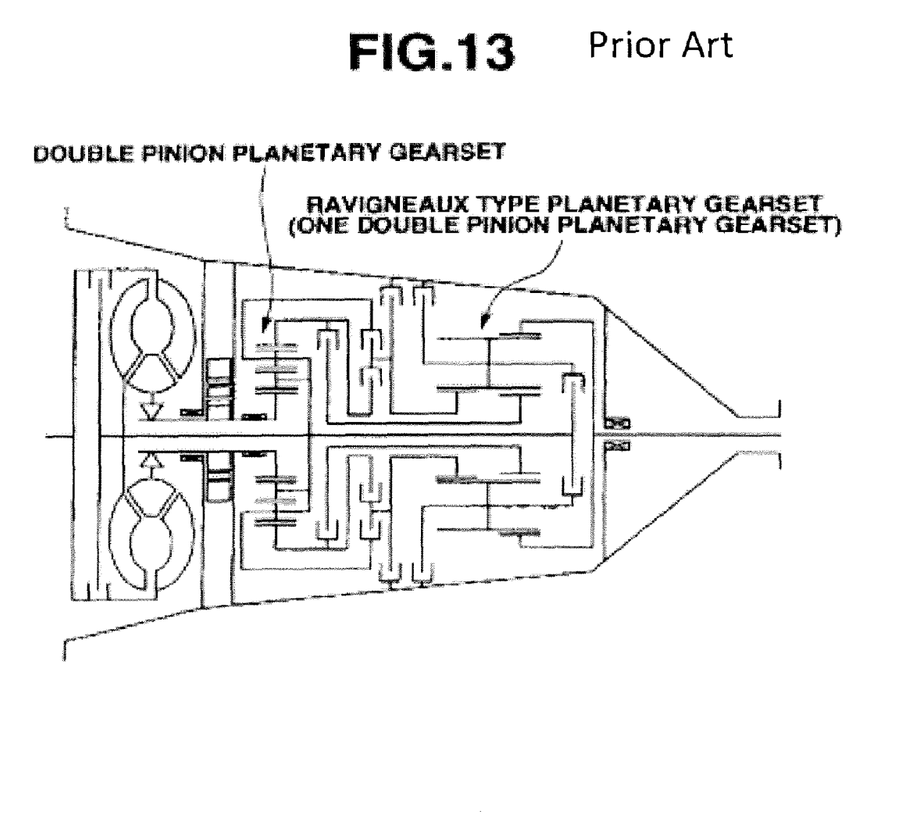
FIG. 13 is a skeleton view representing an automatic transmission of a comparative example to the automatic transmission in the first preferred embodiment.
Figure 14:
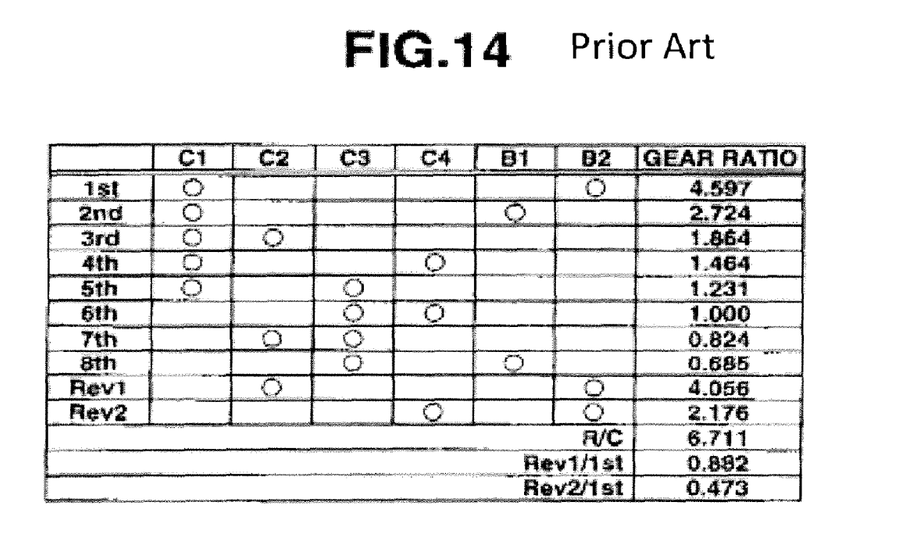
FIG. 14 is a table representing engagement operations achieving the eight forward speed and two reverse speeds by a combination of two simultaneous clutches of six frictional elements in the automatic transmission in the comparative example.

FIG. 13 shows a skeleton view representing the automatic transmission in the comparative example. FIG. 14 shows an engagement operation table by the simultaneous engagements of two frictional elements from among six frictional elements in the automatic transmission in the comparative example shown in FIG. 13 to achieve the eight forward speeds and two reverse speeds. Hereinafter, the advantages of the automatic transmission in the first embodiment as compared with the comparative example will be described in details using FIGS. 13 and 14.

First, the automatic transmission in the first embodiment (FIGS. 1 and 2) is compared with the automatic transmission in the comparative example (FIGS. 13 and 14). At this time, a transmission performance can be equal to each other with respect to the following points.

(Basic Structure and Gear Shift Performance)

Both of the automatic transmission in the first embodiment and that in the comparative example achieve the gear shift stages of the eight forward speeds and first reverse speed by means of any three planetary and six frictional elements.

(Gear Shift Control Performance)

Each of both of the automatic transmission in the first embodiment and that in the comparative example achieves the gear shift to an adjacent gear shift stage by a single replacement gear shift in which a release of one of the frictional elements and an engagement of one of the other frictional elements are made.

However, the automatic transmission in the first embodiment has advantages over the automatic transmission in the following listed points.

(a) Friction loss in each of the gear shift stages: In a case where each of the gear shift stages is obtained by engaging the frictional elements, the frictional loss cannot be avoided due to a drag of one frictional element (release element) which runs idle. However, in the automatic transmission, a smaller frictional loss is preferable.

In a case of the automatic transmission in the comparative example, to achieve the respective gear shift stages by the engagements of the eight forward speeds, the two frictional elements are simultaneously engaged at the respective gear shift stages as shown in FIG. 14. Therefore, for example, the frictional elements which run idle at the first speed (range) are first clutch C1, third clutch C3, fourth clutch C4, and first brake B1. In this way, the frictional elements which run idle are four at the respective gear shift stages. Therefore, the frictional loss becomes larger due to the drag from among the four frictional elements which run idle so that the worsening of the transmission efficiency of energy is introduced. For example, in a case where the automatic transmission in the comparative example is applied to the engine mounted vehicle, the frictional loss due to the four frictional elements which run idle provides a factor for introducing the worsening of the fuel economy performance.

On the other hand, in the case of the automatic transmission in the first embodiment, the three frictional elements are simultaneously engaged at their respective shift stages as shown in FIG. 2 to achieve the respective shift stages of the eight forward speeds. Therefore, for example, the frictional elements which run idle at the first speed (range) are first clutch C1, third clutch C3, and fourth clutch C4. Thus, the frictional elements at each of the gear shift stages are three. The frictional loss at the frictional elements which run idle is suppressed to be small as compared with the comparative example, the improvement in the transmission efficiency of a drive energy can be made. For example, in a case where the automatic transmission in the first embodiment is applied to the engine mounted vehicle, the improvement in a fuel consumption performance is achievable.

(b) For Three Planetary Gearset

In a case where a certain planetary gearset used in the automatic transmission is selected, the single pinion planetary gearset and the double pinion planetary gearset are available as an option. From the viewpoint of the transmission efficiency of gear, the selection of the single pinion planetary gearset is assumed to be more preferable than the double pinion planetary gearset.

In the automatic transmission in the comparative example, as shown in FIG. 13, the double pinion planetary gearset and the Ravigneaux type planetary gear unit (two double pinion planetary gearsets and single pinion planetary gearset) are used. That is to say, since the two double pinion planetary gearsets are substantially used, gear diameters of the pinions are made small and such problems that an endurance reliability is reduced and the number of parts are increased, and, accordingly, a manufacturing cost is increased are raised.

On the other hand, in a case of the automatic transmission in the first embodiment, first planetary gearset PG1 of the double pinion planetary gearset, second planetary gearset, and third planetary gearset are used. Thus, as compared with the automatic transmission in the comparative example in which two double pinion planetary gearsets are used, the number of uses of the double pinion planetary gearset are reduced. Consequently, since a rigidity of each of the pinions and a strength of a tooth surface can be increased, the endurance reliability can be improved, the number of parts are decreased, the decrease in the manufacturing cost can be achieved.

(c) For Small Sizing and Light Weighting.

For example, the automatic transmission for the engine mounted vehicle is mounted in an engine compartment of a limited space together with the engine. Therefore, as a size of the automatic transmission becomes smaller, the better mountability can be assured. In addition, as the weight of the automatic transmission becomes lighter, the increase in a total weight of the vehicle is suppressed and is advantageous (effective) in terms of a fuel economy.

In the case of the automatic transmission in the comparative example, two pieces of linkage members other than the input shaft are needed to be penetrated through an inside position of the sun gear of the Ravigneux type planetary gearset. The inner diameter of the sun gear thereof cannot help of being enlarged. It is, therefore, necessary to enlarge an outer diameter of the ring gear to obtain an appropriate gear ratio. Consequently, a unit size of the automatic transmission (=a trunk diameter) is accordingly enlarged.

Whereas, in the automatic transmission in the first embodiment, it is not necessary to penetrate input shaft IN and output shaft OUT through an inside position of three planetary gearsets PG1, PG2, and PG3. Two linkage members are only needed to be penetrated through the inside positions of sun gears D1 and S2 of first planetary gearset PG1 and second planetary gearset PG2. Therefore, the number of linkage members passing through the inside positions of third planetary gearset PG3 become reduced as compared with the automatic transmission in the comparative example. Therefore, it becomes possible to reduce the unit size of the automatic transmission (=trunk diameter). That is to say, the small sizing and light weighting of the automatic transmission can be achieved.

(d) Gear Ratio Width

A modification width of the gear ratio in the automatic transmission is represented by a ratio coverage (=a minimum gear shift stage gear ratio/a maximum gear shift stage gear ratio: hereinafter, referred to as RC). As RC value becomes larger, the modification width to be carried out for the gear ratio becomes larger. It becomes preferable since a setting degree of freedom of the gear ratio becomes preferably higher.

In the case of the automatic transmission in the comparative example, RC=6.711 (=4.597/0.685) as shown in FIG. 14. On the other hand, in the automatic transmission in the first embodiment, in a case where the gear ratio of first planetary gearset PG1 is $\rho1=-0.4333$, the gear ratio of second planetary gearset PG2 is $\rho2=0.276$ (=4.597/0.685) as shown in FIG. 2, and the third gear ratio of third planetary gearset PG3 is $\rho3=0.508$, RC=10.744 is obtained while maintaining an appropriate step ratio between mutually adjacent shift stages.

Figure 3:
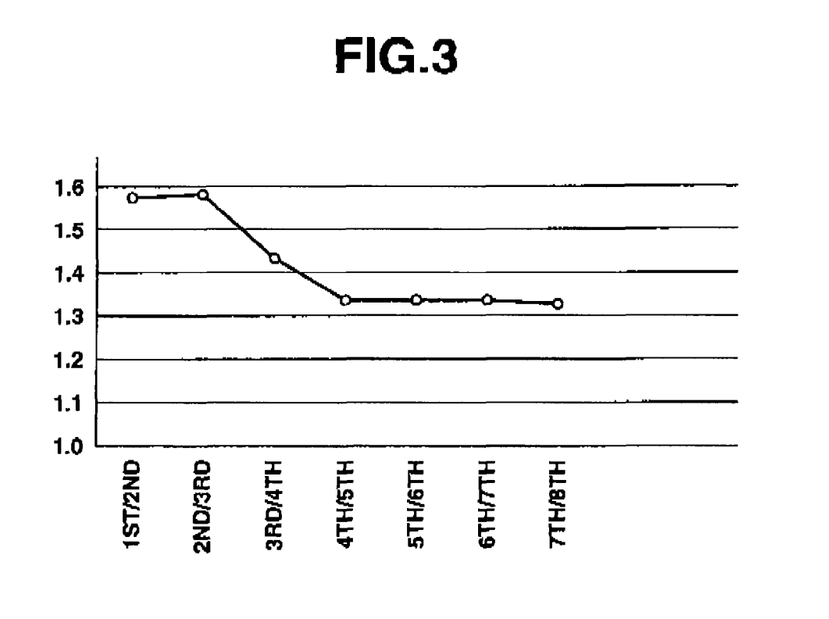
FIG. 3 is a plotted graph representing a variation characteristic of a step ratio which is a gear ratio variation rate at adjacent gear shift stages of eight forward speeds in the automatic transmission in the first preferred embodiment.

That is to say, while the appropriate step ratio is maintained, RC value can be set to a further larger value (about 60% expansion than the automatic transmission in the comparative example) so that a compatibility between a starting performance at the minimum gear shift stage gear ratio and a high-speed fuel economy at the maximum gear shift stage gear ratio can be established. It should, herein, be noted that the meaning of the appropriate step ratio is such that, in a case where the step ratio at each of the gear shift stages is plotted and a characteristic line connecting plotted points can draw a line which is dropped at a smooth gradient from a low gear shift side to a high gear shift side and, thereafter, is transited in a sidewise movement state. The step ratio characteristic in the automatic transmission of the first embodiment draws the characteristic line having the appropriate step ratio such that the step ratio at the low gear side is highest as shown in FIG. 3 and is reduced at a smooth gradient toward the high gear side (2-nd/3-rd, 3-rd/4-th, 4-th/5-th) and, thereafter, is transited in the sidewise movement state (4-th/5-th, 5-th/6-th, 6-th/7-th, 7-th/8-th).

Then, a revolution speed transmitted actually to drive wheels of roads wheels is adjusted at a final gear ratio by a final differential unit mounted at a downstream position of the automatic transmission. Then, as the RC value becomes larger, an adjustment degree of freedom by the final gear ratio becomes higher. For example, it becomes advantageous for the automatic transmission of a hybrid vehicle having no torque converter when the final gear ratio is adjusted to a lower side. It becomes advantages for gasoline engine and diesel engine having different optimum fuel economy region and highest torque region. In more details, in the case of the engine mounted vehicle, both of a start driving force and the fuel economy (a low revolution of engine speed) can become compatible.

(e) Reverse Dynamic Performance 1-st (First speed) gear ratio and reverse gear ratio are values determining a start acceleration characteristic of the vehicle and an ascending slope (up-hill) performance of the vehicle. For example, in a case where a ratio between 1-st (first) speed gear ratio and reverse gear ratio is not placed in a vicinity to 1, a difference in the driving force occurs during a switch between forward and backward starts. In addition, if the reverse gear ratio is lower than the first-speed gear ratio, the driving force during the reverse start becomes lower than that during the forward start so that the reverse start characteristic becomes inferior.

In the case of the automatic transmission in the comparative example, as shown in FIG. 14, Rev1/1-st=0.882 and Rev2/1-st=0.473. In the case of Rev1/1-st, a level such that an insufficient driving force during the reverse (backward) movement can be prevented from occurring is maintained. However, in even either of cases where a reverse 1-st (Rev1) is selected or reverse second speed (Rev2) is selected, the ratio between 1-st speed gear ratio and reverse gear ratio is made lower than 1. Thus, the driving force difference occurs during the switch between the forward and rearward start and the reverse start characteristic becomes deteriorated.

On the other hand, in a case where the automatic transmission in the first embodiment, as shown in FIG. 2, Rev/1-st=1.002 and the ratio between 1-st speed gear ratio and reverse gear ratio is placed in the vicinity to 1. Hence, the driving force difference does not occur during the switch between the forward and reverse starts and the reverse start characteristic is not made inferior. In details, the automatic transmission can be operated without loss in the start acceleration performance and in the ascending slope performance. Next, advantages of the automatic transmission in the first embodiment will, hereinafter, be described.

(1) An automatic transmission comprising: a first planetary gearset (PG1) including a first sun gear (S1), a first ring gear (R1), and a first carrier (PC1) supporting a first double pinion (P1s, P1r) meshed with the first sun gear and the first ring gear; a second planetary gearset (PG2) including a second sun gear (S2), a second carrier (PC2) supporting a second pinion (P2) meshed with the second sun gear, and a second ring gear (R3) meshed with the second pinion; a third planetary gearset (PG3) including a third sun gear (S3), a third carrier (PC3) supporting a third pinion (P3) meshed with the third sun gear, and a third ring gear (R3) meshed with the third pinion, the first sun gear and the second sun gear being at all times linked together to constitute a first rotary member (M1) and the second ring gear and the third ring to gear being at all times linked together to constitute a second rotary member (M2); an input shaft (IN) linked at all times with the first ring gear; an output shaft (OUT) linked at all times with the third carrier; a first frictional element (first clutch C1) which is selectively linked between the first carrier (PC1) and the second carrier (PC2); a second frictional element (second clutch C2) which is selectively linked between the first ring gear (R1) and the second carrier (PC2); a third frictional element (third clutch C3) which is selectively linked between the first rotary member (M1) and the third carrier (PC3); a fourth frictional element (fourth clutch C4) which is selectively linked between the first rotary member (M1) and the third ring gear (R3); a fifth frictional element (first brake B1) which is capable of stopping in an engaged state a revolution of the first carrier (PC1); and a sixth frictional element (second brake B2) which is capable of stopping in the engaged state the revolution of the third ring gear (R3), the six frictional elements being appropriately released or engaged to make a gear shift to a gear shift stage of at least eight forward speeds in order for a torque from the input shaft thereof to be enabled to be outputted to the output shaft and, from among the six frictional elements, a combination of simultaneous engagements of three frictional elements achieving at least eight forward speeds and one reverse speed. Therefore, an improvement in the transmission efficiency of the drive energy can be made by suppressing the frictional loss to be small while achieving the eight forward speeds with the three planetary gearset and the six frictional elements. In addition, since the number of uses of the double pinion planetary gearsets are reduced as compared with the automatic transmission in the comparative example, the endurance reliability is improved and the manufacturing cost reduction can be achieved. In addition, since the number of linkage members passing into the inside of sun gears S1, S2, and S3 become less as compared with the automatic transmission in the comparative example, the endurance reliability is improved and the manufacturing cost reduction can be achieved. Furthermore, since the drive power is outputted from third carrier PC3 whose rigidity of parts is the highest, the rigidity of output shaft OUT can be secured.

(2) By the combination of simultaneous engagements of three frictional elements from among the six frictional elements, at least eight forward speeds comprise: the first speed achieved by the simultaneous engagements of the second frictional element (second clutch (C2)), the fifth frictional element (first brake B1), and the sixth frictional element (second brake B2); the second speed achieved by the simultaneous engagements of the first frictional element (first clutch C1), the second frictional element (second clutch C2), and sixth frictional element (second brake B2); the third speed achieved by the simultaneous engagements of the first frictional element (first clutch C1), third frictional element (third clutch C3), and sixth frictional element (second brake B2); the fourth speed achieved by the simultaneous engagements of the first frictional element (first clutch C1), the fourth frictional element (fourth clutch C4), and the sixth frictional element (second brake B2); the fifth speed achieved by the simultaneous engagements of the first frictional element (first clutch C1), the second frictional element (second clutch C2), and the fourth frictional element (fourth clutch C4); the sixth speed to achieved by the simultaneous engagements of the first frictional element (first clutch C1), the fourth frictional element (fourth clutch C4), and the fifth frictional element (first brake B1); the seventh speed achieved by the simultaneous engagements of the second frictional element (second clutch C2), the fourth frictional element (fourth clutch C4), and the fifth frictional element (first brake B1); and the eighth speed achieved by the simultaneous engagements of the third frictional element (third clutch C3), the fourth frictional element (fourth clutch C4), and the fifth frictional element (first brake B1). Hence, the gear shift toward one of the adjacent shift stages is achieved by the single replacement gear shift according to the engagement of one frictional element and the release of any one of the other frictional elements. A gear shift control, thus, can advantageously be simplified. In addition, the RC value can be set to a required value while maintaining the appropriate step ratio achieving the compatibility between the start performance at the minimum gear shift stage and high-speed fuel economy at the maximum gear shift stage gear ratio.

(3) First (1-st) reverse speed achieved by the combination of simultaneous engagements of three frictional element from among six frictional elements is achieved by simultaneous engagements of the first frictional element (first clutch C1), the fifth frictional element (first brake B1), and the sixth frictional element (second brake B2). Thus, even if the gear ratio such that the appropriate RC value and step ratio are selected to achieve the step ratio, an evaluation value of the reverse gear ratio (=reverse gear ratio/1-st speed gear ratio) can be set to be placed in a vicinity to 1. Consequently, the drive force difference can be prevented from being generated during the switch between the forward and backward runs and a backward start acceleration and an ascending slope performance an be assured.

Second Embodiment

A second preferred embodiment has the same skeleton structure as the first embodiment but the elements during the fifth speed run from among the engagement operation table are made different from the first embodiment 1.

Figure 15:
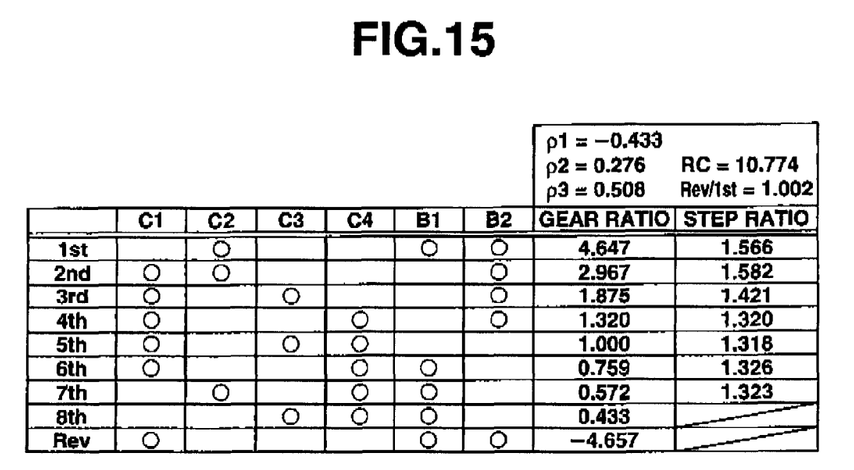
FIG. 15 is a table representing engagement operations achieving the eight forward speed and one reverse speed by a combination of simultaneous engagements from among sixth frictional elements in the automatic transmission of the second preferred embodiment according to the present invention.

First, the structure of the automatic transmission in the second embodiment will be describe below. FIG. 15 shows a table representing the engagement operations achieving the eight forward speeds and one reverse speed by the combination of the three simultaneous engagements from among the six frictional elements in the automatic transmission in the second embodiment.

The automatic transmission in the second embodiment achieves each of the gear shift stages of the eight forward speeds and one reverse (1-st) speed by the combination of the three simultaneous engagements from among six frictional elements C1, C2, C3, C4, B1, and B2, as described below.

The gear shift stage of the first speed (1-st) is achieved by the simultaneous engagements of second clutch C2, first brake B1 (or one-way clutch OWC), and second brake B2, as shown in FIG. 15.

The gear shift stage of the second speed (2-nd) is achieved by the simultaneous engagements of first dutch C1, second clutch C2, and second brake B2, as shown in FIG. 15.

The gear shift stage of the third speed (3-rd) is achieved by the simultaneous engagements of first clutch C1, third clutch C3, and second brake B2, as shown in FIG. 15.

The gear shift stage of the fourth speed (4-th) is achieved by the simultaneous engagements of first clutch C1, fourth clutch C4, and second brake B2, as shown in FIG. 15.

The gear shift stage of the fifth speed (5-th) is achieved by the simultaneous engagements of first clutch C1, third clutch C3, and fourth clutch C4, as shown in FIG. 15.

The gear shift stage of the sixth speed (6-th) is achieved by the simultaneous engagements of first dutch C1, fourth clutch C4, and first brake B1 as shown in FIG. 15.

The gear shift stage of the seventh speed (7-th) is achieved by the simultaneous engagements of second clutch C2, fourth clutch C4, and first brake B1 as shown in FIG. 15. (as attached hereinbelow), as shown in FIG. 15.

The gear shift stage of the eighth speed (8-th) is achieved by the simultaneous engagements of third clutch C3, fourth clutch C4, and first brake B1 as shown in FIG. 15.

The gear shift stage of the reverse speed (Rev) is achieved by the simultaneous engagement of first clutch C1, first brake B1, and second brake B2 as shown in FIG. 15. It should be noted that, since other structures of the automatic transmission in the second embodiment are the same as those in the first embodiment described above, the detailed description thereof with reference to the drawings in the automatic transmission of the second embodiment will, herein, be omitted.

Figure 16:
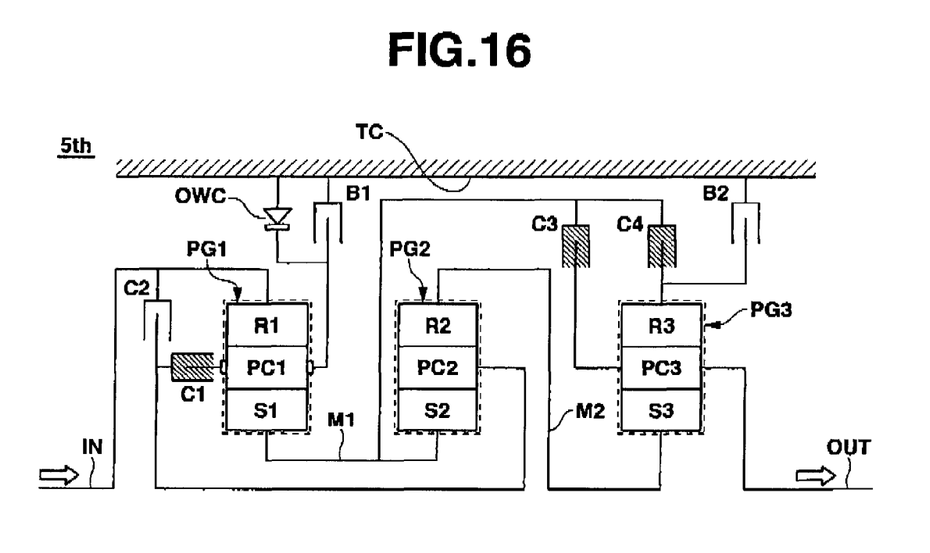
FIG. 16 is an explanatory view representing a gear shift operation at the gear shift stage of the fifth speed in a case of the automatic transmission in the second preferred embodiment.

Next, an operation of the automatic transmission in the second embodiment will be described. FIG. 16 shows an explanatory view of the gear shift action at the gear shift stage of the fifth speed in the automatic transmission of the second embodiment. Hereinafter, a gear shift action at the gear shift stage of the fifth (5-th) speed will be described on a basis of FIG. 16.

(Gear Shift Stage of the Fifth Speed)

At the gear shift stage of the fifth speed (range), first clutch C1, third clutch C3, and fourth clutch C4 are simultaneously engaged, as shown by the hatchings in FIG. 16.

The simultaneous engagement of first clutch C1, third clutch C3, and fourth clutch C4, first rotary member M1, and second rotary member M2 cause three revolutional (rotary) elements S1, PC1, R1 of first planetary gearset PG1 to be revolved together in a unit, three rotary elements S2, PC2, R2 of second planetary gearset PG2 to be revolved together in a unit, and three revolutional (rotary) elements S3, PC3, R3 of third planetary gearset PG3 to be revolved together in a unit.

Hence, when the input revolution speed is inputted to first ring gear R1 via input shaft IN, first planetary gearset PG1, second planetary gearset PG2, and third planetary gearset PG3 are revolved together in a unit with the input revolution speed. At this time, the revolution speed of output shaft OUT is made equal to the input revolution speed from input shaft IN to achieve the gear shift stage of the fifth speed with the gear shift ratio of 1 (direct coupled gear shift stage).

(f) Skip Gear Shift

For example, as a running scene of a case where a transition is made from a flat road to a descending slope (down-hill), the vehicle travels using the second speed (range) and third speed (range) at an under-drive side. During the travel described above, an acceleration release to (accelerator foot release) operation is carried out to have an intention of a vehicle speed maintenance. At this time, a two-step up-shift from the second speed to the direct coupled stage (fifth speed) and a foot release up-shift according to a first stage skip up-shift from the third speed to the direct coupled stage (the fifth speed) is carried out.

In a case of the automatic transmission in the comparative example, the sixth speed which is the direct coupled stage is obtained by a single engagement pattern of the simultaneous engagement of third clutch C3 and fourth clutch C4, as shown in FIG. 14. Therefore, a three-step skip up-shift from the second speed to the direct coupled stage (sixth speed) and the two-step skip up-shift from the third speed to the direct coupled stage (sixth speed) indicate such a double gear shift replacement that the releases of two frictional elements and the engagements of any other two frictional elements are carried out. Thus, when the accelerator (pedal) release operation is carried out to intend to a deceleration, a certain time is required from a time of a start of the gear shift to a time of an end of the gear shift based on a gear shift command. Then, a response of a reduction in the driving force for the deceleration demand appearing on the accelerator (pedal) release operation by the driver is delayed.

Whereas, in the case of the automatic transmission in the first embodiment, the fifth speed which is the direct coupled stage can be obtained by either of two engagement patterns of a first engagement pattern obtained by the simultaneous engagements of first clutch C1, second clutch C2, and fourth clutch C4 (FIG. 2) and a second engagement pattern obtained by the simultaneous engagements of first clutch C1, third clutch C3, and fourth clutch C4 (FIG. 15). Therefore, in a case of the two-step skip up-shift from the second speed to the direct coupled stage (fifth speed), the first engagement pattern (FIG. 2) is selected to enable the achievement by the single replacement gear shift such that the first frictional engagement is released and the second frictional engagement is engaged. On the other hand, in a case of the single-step skip up-shift from the third speed to the direct coupled stage (fifth speed), the second engagement pattern (FIG. 15) is selected to enable the achievement by a single replacement gear shift such that one frictional element is released and any other one frictional element is engaged. Thus, when the accelerator (pedal) release operation is carried out to intend to carry out the deceleration, the gear shift is finished in a short time from a time of the gear shift start based on the gear shift command and a response of the driving force reduction to a deceleration request appearing on the accelerator release operation by the driver is assured.

For example, as a running scene in which the vehicle travels on a highway road, during a cruise speed travel at the seventh speed or at the eighth speed of an overdrive side of the gear shift stage, the accelerator (pedal) depression is carried out. At this time, when the accelerator (pedal) depression operation is carried out to intend to overtake another vehicle running in a forward position of the vehicle, a depression responsive down-shift of a one-step skip down-shift from the seventh speed to the direct coupled stage (fifth speed) or a two-step skip down gear shift from the eighth speed to the direct coupled stage (the fifth speed) is carried out.

On the other hand, in the automatic transmission in the first embodiment, the fifth speed which is the direct coupled stage can be obtained by either one of the first engagement pattern (FIG. 2) obtained by the simultaneous engagements of first clutch C1, second clutch C2, and fourth clutch C4 or the second engagement pattern (FIG. 15) obtained by the simultaneous engagements of first clutch C1, second clutch C2, and fourth clutch C4.

Thus, in a case of the one-step skip down-shift from the seventh speed to the direct coupled stage (fifth speed), the first engagement pattern (FIG. 2) is selected so that the single gear shift replacement such that one frictional element is released and any one of the other frictional elements are carried out. On the other hand, in the case of the two-stage skip down gear shift from the eighth speed to the direct coupled stage (fifth speed), the second engagement pattern (FIG. 15) is selected so that the single gear shift replacement such that the release of the one frictional element and the engagement of any other one of the frictional elements are carried out can be achieved.

Hence, when the accelerator (pedal) depression operation to intend to perform an intermediate acceleration, the gear shift is ended in a short time from the start of the gear shift based on the gear shift command. In addition, the response in the driving force rise to the intermediate acceleration requirement is assured. It should be noted that other actions in the second embodiment are equal to those in the case of the first embodiment, the explanations of the other actions will, herein, be omitted.

Next, the advantages of the automatic transmission in the second embodiment will be explained below. The automatic transmission in the second embodiment can obtain the following advantages in addition to those described in (1) through (3) of the first embodiment.

(4) According to the combination of three simultaneous engagements of three frictional elements from among the six frictional elements, at least forward eighth speeds include: the first speed achieved by the simultaneous engagements of the second frictional element (second clutch C2), the fifth frictional element (first brake B1), and the sixth frictional element (second brake B2); the second speed achieved by the simultaneous engagements of the first frictional element (first clutch C1), the second frictional element (second clutch C2), and the sixth frictional element (second brake B2); the third speed achieved by the simultaneous engagements of the first frictional element (first clutch C1), the third frictional element (third clutch C3), and the sixth frictional element (second brake B2); the fourth speed achieved by the simultaneous engagements of the first frictional element (first clutch C1), the third frictional element (third clutch C3), and the sixth frictional element (second brake B2); the fifth speed achieved by the simultaneous engagements of the first frictional element (first clutch C1), the second frictional element (second clutch C2), and the fourth frictional element (fourth clutch C4); the sixth speed achieved by the simultaneous engagements of the first frictional element (first clutch C1), the fourth frictional element (fourth clutch C4), and the fifth frictional element (first brake B1); the seventh speed achieved by the simultaneous engagements of the second frictional element (second clutch C2), the fourth frictional element (fourth clutch C4), and the fifth frictional element (second brake B2); and the eighth speed achieved by the simultaneous engagements of the third frictional element (third clutch C3), the fourth frictional element (fourth clutch C4), and the fifth frictional element (second brake B2). Hence, the gear shift to one of the adjacent gear shift stages is achieved by the single replacement of the gear shift of the engagement of one of the frictional elements white the release of another one of the other frictional elements. Hence, the gear shift control can advantageously be simplified. In addition, the RC value can be set to the value reached to the required value taking the compatibility between the start performance at the minimum gear shift stage gear ratio and the high-speed fuel economy at the maximum gear shift stage gear ratio. In addition, since one of the two engagement patterns is selectable, in a case where the up-shift and down-shift of the two-step skip and the three-step skip are requested, the skip gear shift with a good response can be achieved by the single replacement of the gear shift according to the engagement of one frictional element and the release of the other frictional element.

As described hereinabove, the automatic transmission according to the present invention has been described on a basis of the first and second embodiments, the specific structure is not limited to each of these embodiments. The modification and addition of designs are permitted without departing from the scope and sprit of each of the claims. The present invention is not limited to the first and second embodiments described above.

In each of the first and second embodiments, a gear ratio of first planetary gearset PG1 is $\rho1=-0.433$ and a gear ratio of second planetary gearset PG2 is $\rho2=0.276$, and a third gear ratio of third planetary gearset PG3 is $\rho3=0.508$. However, gear ratio $\rho$ of each of planetary gearsets PG1, PG2, and PG3 is a value within a range possible at the gear ratio setting. A specific value of this gear ratio is not limited to that described in the first embodiment if this gear ratio is set to the value in which the RC value is high or set to obtain the appropriate step ratio.

In the first embodiment, the specific example of the automatic transmission to be applied to an FR (Front-engine Rear-drive) engine vehicle in which an input-output axle is coaxially arranged is illustrated. However, the present invention is applicable to the automatic transmissions of various types vehicles of FF (Front-engine Front-drive) engine vehicle, a hybrid vehicle, an electric vehicle, and a fuel cell vehicle.

This application is based on a prior Japanese Patent Application No. 2009-178804 filed in Japan on Jul. 31, 2009. The entire contents of this Japanese Patent Application No. 2009-178804 are herein incorporated by reference in its entirety. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:
1. An automatic transmission comprising:
a first planetary gearset including a first sun gear, a first ring gear, and a first carrier supporting a first double pinion meshed with the first sun gear and the first ring gear;

a second planetary gearset including a second sun gear, a second carrier supporting a second pinion meshed with the second sun gear, and a second ring gear meshed with the second pinion;

a third planetary gearset including a third sun gear, a third carrier supporting a third pinion meshed with the third sun gear, and a third ring gear meshed with the third pinion, the first sun gear and the second sun gear being directly linked together to constitute a first rotary member and the second ring gear and the third sun gear being directly linked together to constitute a second rotary member;

an input shaft linked directly to the first ring gear;

an output shaft linked directly to the third carrier;

a first frictional element selectively linked between the first carrier and the second carrier;

a second frictional element selectively linked between the first ring gear and the second carrier;

a third frictional element selectively linked between the first rotary member and the third carrier;

a fourth frictional element selectively linked between the first rotary member and the third ring gear;

a fifth frictional element capable of stopping in an engaged state a revolution of the first carrier; and a sixth frictional element capable of stopping in the engaged state the revolution of the third ring gear, the six frictional elements being appropriately released or engaged to make a gear shift to a gear shift stage of at least eight forward speeds in order for a torque from the input shaft to be enabled to be output to the output shaft and, from among the six frictional elements, a combination of simultaneous engagements of three frictional elements achieving the at least eight forward speeds and one reverse speed.

2. The automatic transmission as claimed in claim 1, wherein, according to the combination of the simultaneous engagements of the three frictional elements from among the six frictional elements, the at least eight forward speeds include: a first speed achieved by the simultaneous engagements of the second frictional element, the fifth frictional element, and the sixth frictional element; a second speed achieved by the simultaneous engagements of the first frictional element, the second frictional element, and the sixth frictional element; a third speed achieved by the simultaneous engagements of the first frictional element, the third frictional element, and the sixth frictional element; a fourth speed achieved by the simultaneous engagements of the first frictional element, the fourth frictional element, and the sixth frictional element; a fifth speed achieved by the simultaneous engagements of the first frictional element, the second frictional element, and the fourth frictional element; a sixth speed achieved by the simultaneous engagements of the first frictional element, the fourth frictional element, and the fifth frictional element; a seventh speed achieved by the simultaneous engagements of the second frictional element, the fourth frictional element, and the fifth frictional element; and an eighth speed achieved by the simultaneous engagements of the third frictional element, the fourth frictional element, and the fifth frictional element.

3. The automatic transmission as claimed in claim 1, wherein, according to the combination of the simultaneous engagements of the three frictional elements from among the six frictional elements, the at least eight forward speeds include: a first speed achieved by the simultaneous engagements of the second frictional element, the fifth frictional element, and the sixth frictional element; a second speed achieved by the simultaneous engagements of the first frictional element, the second frictional element, and the sixth frictional element; a third speed achieved by the simultaneous engagements of the first frictional element, the third frictional element, and the sixth frictional element; a fourth speed achieved by the simultaneous engagements of the first frictional element, the fourth frictional element, and the sixth frictional element; a fifth speed achieved by the simultaneous engagements of the first frictional element, the third frictional element, and the fourth frictional element; a sixth speed achieved by the simultaneous engagements of the first frictional element, the fourth frictional element, and the fifth frictional element; a seventh speed achieved by the simultaneous engagements of the second frictional element, the fourth frictional element, and the fifth frictional element; and an eighth speed achieved by the simultaneous engagements of the third frictional element, the fourth frictional element, and the fifth frictional element.

4. The automatic transmission as claimed in claim 1, wherein, the one reverse speed, achieved according to the combination of the simultaneous engagements of the three frictional elements from among the six frictional elements, is achieved by the simultaneous engagements of the first frictional element, the fifth frictional element, and the sixth frictional element.

5. The automatic transmission as claimed in claim 1, wherein the first planetary gearset is a first double pinion planetary gearset, the second planetary gearset is a first single pinion planetary gearset, the third planetary gearset is a second single pinion planetary gearset, the first frictional element is a first clutch, the second frictional element is a second clutch, the third frictional element is a third clutch, the fourth frictional element is a fourth clutch, the fifth frictional element is a first brake, and the sixth frictional element is a second brake.

6. The automatic transmission as claimed in claim 5, wherein the automatic transmission further comprises: a transmission casing to which the third ring gear is fixed when the second brake is engaged, the first clutch and the second clutch being simultaneously engaged to revolve the first sun gear, the first carrier, and the first ring gear and to revolve the second sun gear, the second carrier, and the second ring gear together in a unit at a second speed of the gear shift stage.

7. The automatic transmission as claimed in claim 6, wherein the automatic transmission further comprises:
a one-way clutch that together with the second clutch and the second brake are simultaneously engaged during a driving at a first speed of the gear shift stage, and
a self lock of the one-way clutch causing the first carrier to be fixed to the transmission casing,
wherein the first brake, and the second brake are simultaneously engaged during a coasting at the first speed of the gear shift stage.

8. The automatic transmission as claimed in claim 7, wherein a gear ratio of the first planetary gearset is −0.433, a gear ratio of the second planetary gearset is 0.276, and a gear ratio of the third planetary gearset is 0.508.

* * * * *